Figure 1:
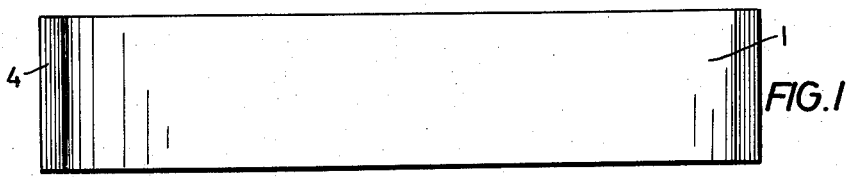

March 11, 1958 W. OSENBERG 2,826,015
ROTARY GRINDING WHEELS
Filed July 26, 1955 2 Sheets-Sheet 1

INVENTOR.
WERNER OSENBERG
BY
Wenderoth, Lind & Ponack
Attys.

March 11, 1958  W. OSENBERG  2,826,015
ROTARY GRINDING WHEELS
Filed July 26, 1955  2 Sheets-Sheet 2
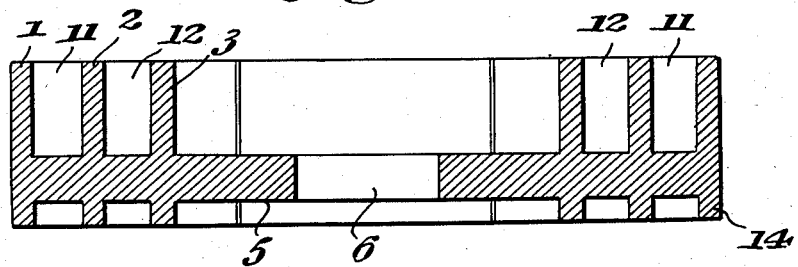
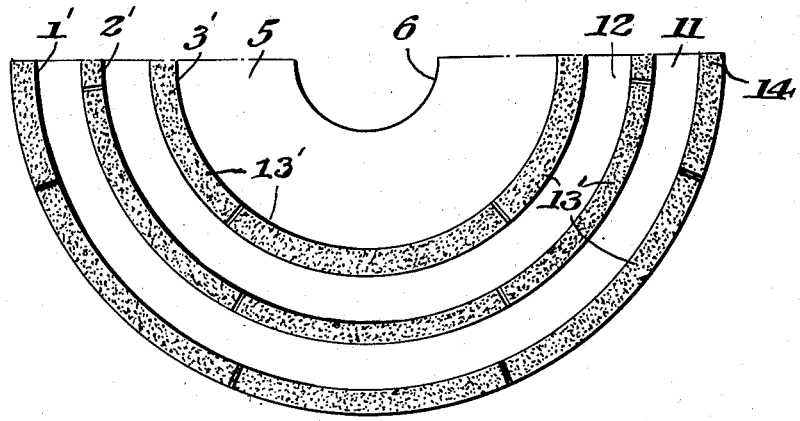
INVENTOR.
Werner Osenberg
BY
Wenderoth, Lind & Ponack
ATTYS.

United States Patent Office 2,826,015
Patented Mar. 11, 1958

2,826,015

ROTARY GRINDING WHEELS

Werner Osenberg, Gehrden, Germany, assignor to Bisterfeld & Stolting, Radevormwald, Germany Application July 26, 1955, Serial No. 524,557

Claims priority, application Germany August 12, 1954

11 Claims. (Cl. 51—195)

This invention relates to improvements in rotary grinding wheels.

Known flexible grinding discs composed of abrasive grains distributed in a bond of hardenable synthetic resin between layers of strips of high tensile strength are capable of being used, in contast to ceramically bonded discs, at appreciably higher cutting speeds with a considerable saving in grinding costs, among other advantages.

These grinding discs are rarely used on their peripheral edges or on their faces but are inclined at an angle of from 15° to 30° in relation to the work. For face grinding resilient ring or pot-shaped grinding wheels have already been used, such wheels having a synthetic resin bond and fabric layers which are built up in the same manner as the discs. These resilient ring or pot-shaped grinding wheels are not cylindrical, but have conically inclined walls; they require for their construction a special synthetic resin for the bond and additional measures to prevent the disposition of the fabric layers being disturbed during formation.

An abrasive body according to the invention has, in contrast to the forms of flexible grinding wheels already known, the shape of a cylindrical annulus which is homogeneous or made up of strip and serves exclusively for face grinding, the wall thickness of the annulus being small by comparison with its radius of curvature. The face of the annulus may be continuous or slotted, and may even be composed of several cylindrical segments, and such forms of construction are to be regarded as falling within the scope of the invention as broadly defined.

Manufacture is effected either with the use of heated pressure rollers, by tightly winding on to a mandrel selected widths of strip fabric or foil impregnated or coated with synthetic resin, such as a phenol formaldehyde condensate, bonding a distribution of abrasive grains, whilst ensuring that the strip is not torn and the resin and the abrasive grains are distributed as evenly as possible, or by pressing laminated, as yet unhardened, laminations in cylindrical moulds.

The abrasive bodies according to the invention may be finally hardened after or during their shaping and subsequently cemented, inserted or tensioned into metal or nonmetallic backings. For the purpose of obtaining high grinding performances several cylindrical annuli of differing diameters are secured concentrically with intervening spaces on a common backing.

Apart from this above described type of attachment, there is also the possibility of inserting one or more laminated grinding annuli into a suitably constructed pressing mould after effecting the preliminary compression and hardening, and combining them therein, by welding with the use of pressure and heat, with a likewise laminated backing bonded with synthetic resin but which naturally contains no abrasive.

By welding several annuli to a common backing a multi-ring wheel is then produced having broad and deep dust collecting spaces between the individual cutting faces of the grinding rings.

Figure 2:
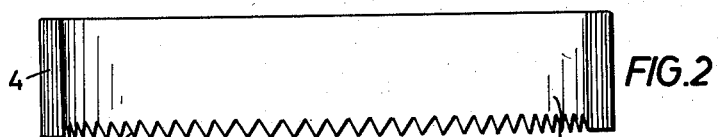
Figure 3:
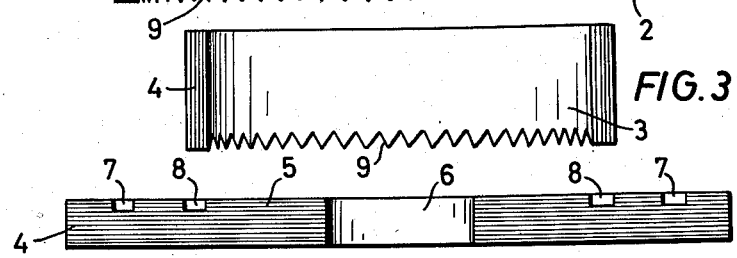
Figure 4:
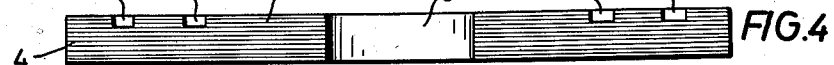
Figure 5:
Figure 6:
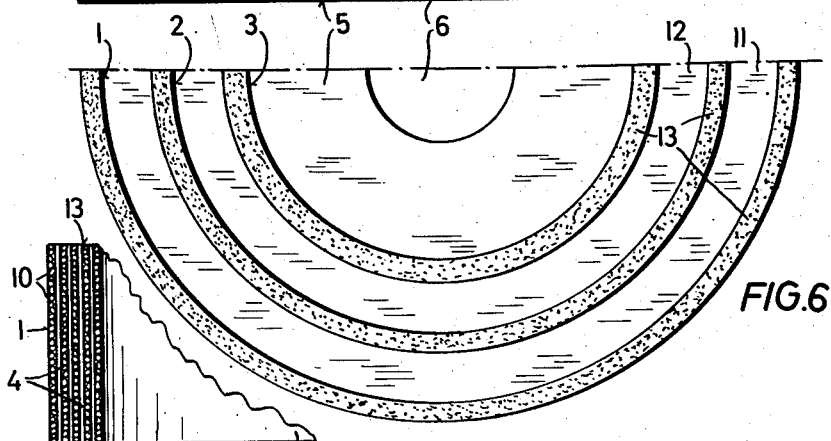
Figure 7:

The invention will be further described by way of example with reference to the accompanying diagrammatic drawings, in which:

Figs. 1–3 show cross sections through flexible abrasive bodies of hollow cylindrical shape and of varying diameters, Fig. 4 shows a cross section through a circular, synthetic resin-bound, laminated backing, Fig. 5 shows a cross section through three hollow cylindrical flexible abrasive bodies which have been combined with the synthetic resin-bound base plate of Fig. 4 by welding to form a multi-ring wheel, Fig. 6 shows a plan view of the multi-ring wheel according to Fig. 5, Fig. 7 shows a partial cross section on a larger scale through a flexible abrasive body constructed of laminated fabric strips steeped in synthetic resin, Fig. 8 is a cross-sectional view through three hollow cylindrical flexible abrasive bodies which project beyond the backing on both sides and Fig. 9 is a partial plan view of a multi-ring wheel wherein the flexible abrasive bodies are formed as cylindrical segments.

The hollow cylindrical or annular abrasive bodies having thin walls according to the invention are indicated in Figs. 1–3 by 1, 2 and 3, respectively, and the laminations by 4. The annular abrasive bodies 1, 2 and 3 may, after a preliminary compacting and hardening, be combined by welding under pressure and applied heat in a suitably constructed pressing mould with a similarly bound laminated backing 5 shown in Fig. 4, so that a multi-ring wheel having the dust collecting compartments 11 and 12 shown in Fig. 5, is produced. As shown in Fig. 8, the hollow cylindrical abrasive bodies may project as at 14 beyond the backing 5 on both sides.

To improve the weld, annular grooves 7 and 8 are formed in the backing 5, as shown in Fig. 4, to receive the cylindrical bodies and serrations 9 are formed on the hollow bodies 2 and 3 (see Figs. 2 and 3). The backing may also be constructed as a plain laminated plate. It has the bore 6 for attaching the multi-ring wheel to a grinding spindle.

As already mentioned, the hollow cylindrical abrasive bodies 1, 2 and 3 may alternatively be cemented or inserted under tension in metal backings.

The construction of the abrasive body 1 is indicated in Fig. 7. The non-metallic or metal abrasive grains 10 are embedded in each case between layers of strip 4 of high tensile strength and then become exposed during grinding by abrading of the synthetic resin bond to present narrow cutting edges 13 in the rings of the wheel.

In Fig. 9 the abrasive bodies 1', 2' and 3' are formed as cylindrical segments 13'.

Steel wool may be incorporated in the abrasive body as an admixture which increases the overall strength thereof and in addition fixes the abrasive grains, such an incorporation being more feasible where the abrasive body is of a homogeneous character, that is to say where strip material is not used. The invention visualises a wall thickness of the cylindrical annulus which, expressed as a ratio to the radius of curvature, is in a range of from 1:5 to 1:50; a preferred range is 1:20 to 1:30. From this range follows by way of example that the wall thickness of the cylindrical annulus may be from 7 to 2 mm. if its diameter amounts to 200 mm.

The limits of the range quoted are largely arbitrary, since the invention is applicable to a wide variety of abrading compositions—it is more the case that the wall thickness is selected in relation to the radius of curvature having regard to the degree of flexibility required in the grinding wheel.

What I claim is:

1. A flexible grinding body comprising fabric layers saturated with artificial resin having grains of abrasive material embedded therein, said layers being arranged in strata and pressed to form a hollow thin-walled cylindrical grinding body, a common carrier disk and a plurality of said hollow cylindrical grinding bodies being arranged concentrically at a distance substantially greater than the thickness of said thin-walled bodies from one another on said carrier disk.

2. A flexible grinding body as set forth in claim 1 wherein said carrier disk is provided with annular grooves and said hollow cylindrical grinding bodies are fixed in said grooves.

3. A flexible grinding body as set forth in claim 1 wherein said carrier disk is a laminated plate bound together by a synthetic resin.

4. A flexible grinding body as set forth in claim 1 wherein said carrier disk and said hollow cylindrical grinding bodies are welded together.

5. A flexible grinding body as set forth in claim 1 wherein said carrier disk is provided with annular grooves and said hollow cylindrical grinding bodies are fixed in said grooves, the ends of said hollow cylindrical bodies fixed in said grooves having serrations thereon.

6. A flexible grinding body as set forth in claim 1 wherein said hollow cylindrical grinding bodies project beyond said carrier disk at both sides thereof.

7. A flexible grinding body as set forth in claim 1 wherein said hollow cylindrical grinding bodies comprise segments.

8. A flexible grinding body as set forth in claim 1 wherein the thickness of the walls thereof is small in proportion to their radii of curvature.

9. A flexible grinding body as set forth in claim 1 wherein the thickness of a wall of said cylindrical hollow grinding body to the radius of curvature lies within the limits 1:20 to 1:30.

10. A flexible grinding body as claimed in claim 1 wherein the distance between said hollow cylindrical grinding bodies is about double the wall thickness of said grinding bodies.

11. A flexible grinding body as claimed in claim 1 wherein the wall thickness of said hollow cylindrical grinding bodies is 2 to 7 mm.

References Cited in the file of this patent

UNITED STATES PATENTS

| 833,653 | Whelpley | Oct. 16, 1906 |
| 1,437,234 | Fraser | Nov. 28, 1922 |
| 1,622,942 | Chase | Mar. 29, 1927 |
| 2,001,911 | Wooddell et al. | May 21, 1935 |
| 2,201,410 | Simonds | May 21, 1940 |
| 2,248,064 | Carlton et al. | July 8, 1941 |
| 2,379,141 | Fuller | June 26, 1945 |
| 2,409,363 | Kratky | Oct. 15, 1946 |
| 2,682,735 | Buckner | July 6, 1954 |

FOREIGN PATENTS

| 571,823 | Great Britain | Sept. 11, 1945 |
| 730,774 | France | May 23, 1932 |